(12) United States Patent
Kim et al.

(10) Patent No.: US 6,698,019 B1
(45) Date of Patent: Feb. 24, 2004

(54) APPARATUS AND METHOD FOR CONTROLLING VIEWING OF VIDEO SIGNALS

(75) Inventors: Do Hyun Kim, Seoul (KR); Myeong Joon Kang, Songtan-Shi (KR)

(73) Assignee: LG Electronics Inc., Seoul (KR)

( * ) Notice: Subject to any disclaimer, the term of this patent is extended or adjusted under 35 U.S.C. 154(b) by 719 days.

(21) Appl. No.: 09/640,368

(22) Filed: Aug. 17, 2000

Related U.S. Application Data

(63) Continuation of application No. 08/812,136, filed on Mar. 5, 1997.

(30) Foreign Application Priority Data

Mar. 5, 1996 (KR) .............................................. 96-5721

(51) Int. Cl.⁷ .......................... H04N 7/16; H04N 7/167
(52) U.S. Cl. .................... 725/25; 725/27; 725/28; 725/30; 380/241; 380/242
(58) Field of Search ............... 455/3.01, 3.05; 725/25–31; 380/210–242

(56) References Cited

U.S. PATENT DOCUMENTS

| | | |
|---|---|---|
| 4,930,158 A | 5/1990 | Vogel |
| 4,930,160 A | 5/1990 | Vogel |
| 5,371,795 A | 12/1994 | Vogel |
| 5,485,518 A | 1/1996 | Hunter et al. |
| 5,550,575 A * | 8/1996 | West et al. .................... 725/28 |
| 5,583,576 A | 12/1996 | Perlman et al. |
| 5,758,258 A | 5/1998 | Shoff et al. |
| 5,828,402 A | 10/1998 | Collings |

* cited by examiner

*Primary Examiner*—Andrew Faile
*Assistant Examiner*—Christopher Nalevanko
(74) *Attorney, Agent, or Firm*—Birch, Stewart, Kolasch & Birch, LLP

(57) ABSTRACT

An apparatus and method for controlling viewing of video programs. The apparatus includes a signal unit for receiving and processing a video signal, a decoding unit for decoding a grade code of a video program contained in the video signal, a key input unit for receiving control data from a user wherein the control data includes a secret number, a storage unit for prestoring a grade code and a secret number, and a control unit for comparing the decoded grade code with the prestored grade code, comparing the secret number inputted to the key input unit with the prestored secret number if the decoded grade code matches the prestored grade code, and outputting the video signal to the user if the secret numbers match.

18 Claims, 7 Drawing Sheets

APPARATUS AND METHOD FOR CONTROLLING VIEWING OF VIDEO SIGNALS

This application is a continuation of co-pending application Ser. No. 08/812,136, filed on Mar. 5, 1997, the entire contents of which are hereby incorporated by reference.

BACKGROUND OF THE INVENTION

1. Field of the Invention

This invention is related to an apparatus and method for controlling viewing of video signals using program grade codes and user's control data.

2. Description of Related Art

Conventional methods of controlling viewing of conventional video machines will be described hereinafter.

FIG. 1a shows a flowchart representing a first conventional method described in Korean Patent Application No. 87-15449 filed by the applicants of the present invention. In this method, a secret code must be inputted by a user in order for the user to access a video machine. If the inputted secret code does not match a prestored secret code, the user is denied access to the video machine.

FIG. 1b shows a flowchart representing a second conventional method for controlling viewing of a vide machine. As shown in FIG. 1b, the second method uses a video machine that recognizes the program selected by a user. If the program selected through a user display is not an adult program, the video machine is in a playback state. If the selected program is an adult program, the video machine compares the inputted secret code with a prestored secret code. If the two codes match, the video machine enters a playback state. But if the two codes do not match, then the video machine is stopped.

A third conventional method is described in Korean Patent Application No. 90-5219 filed by the applicants of the present invention, as shown in FIG. 1c. As shown therein, when the user inputs a secret code for each program and the inputted secret code and the prestored secret code are the same, the video machine playbacks the program. But if the secret codes do not match, the video machine is stopped.

The above-described conventional methods, however, have the following problems. In the first conventional method, it is impossible for the user to selectively view the programs because the use of the video machine itself is limited. The second conventional method has a problem in that if the user display is not provided or broken, or if the user display is changed by the user, it is impossible to limit viewing by others. The third conventional method has a disadvantage in that the user himself must input each secret code for each program.

SUMMARY OF THE INVENTION

The present invention has been provided to solve the problems of conventional methods.

An object of the present invention is to provide an apparatus and method for controlling viewing of a video signal using a grade system for video programs.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and the advantages of the present invention will be readily appreciated as the same becomes better understood by reference to the following detailed description when considered in connection with accompanying drawings, in which like reference numerals denoted the same parts throughout the figures and wherein.

DETAILED DESCRIPTION OF THE PREFERRED EMBODIMENTS

A preferred embodiment of the present invention is discussed hereinafter with reference to the accompanying drawings. A video signal in the present invention encompasses a TV signal, a cable signal, a video tape signal, a DVD signal, or the like. A video program in the present invention encompasses a TV program, a cable program, a video tape program, a DVD program, or the like. A video signal can carry a video program, and a video program is contained in a video signal. A video machine in the present invention can be any device that processes a video signal and/or video program.

Figure 1A:
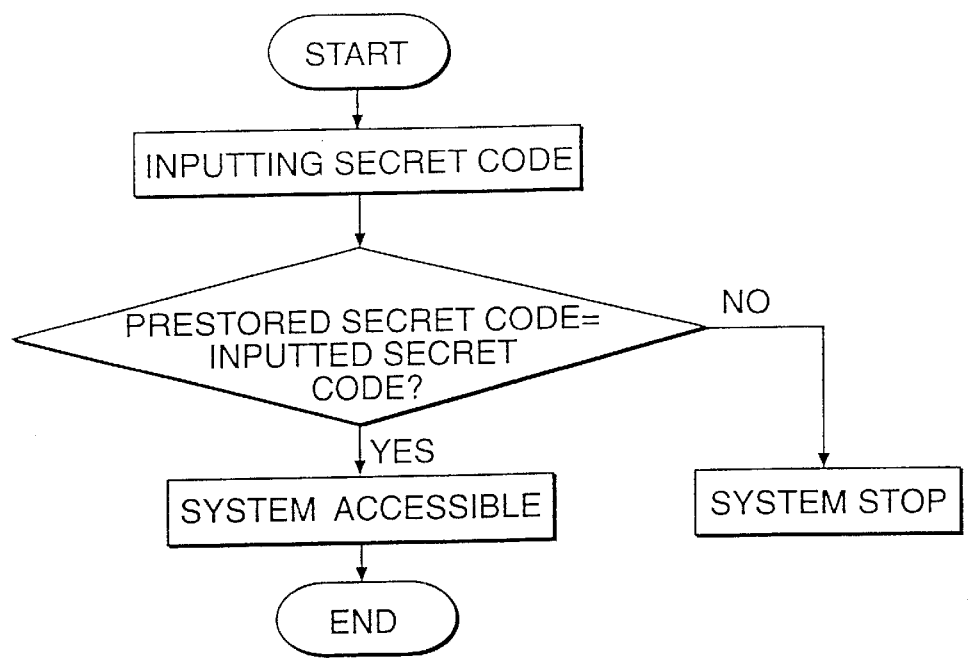
FIGS. 1a–1c are flowcharts showing steps of conventional methods for controlling video viewing.
Figure 1B:
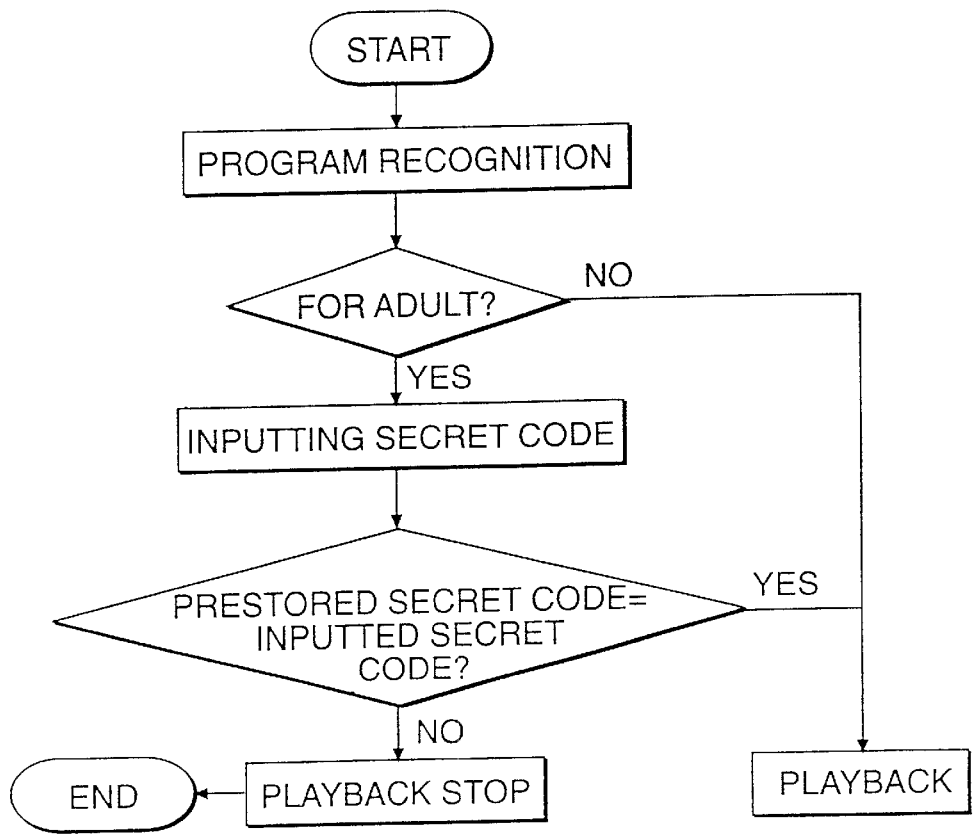
Figure 1C:
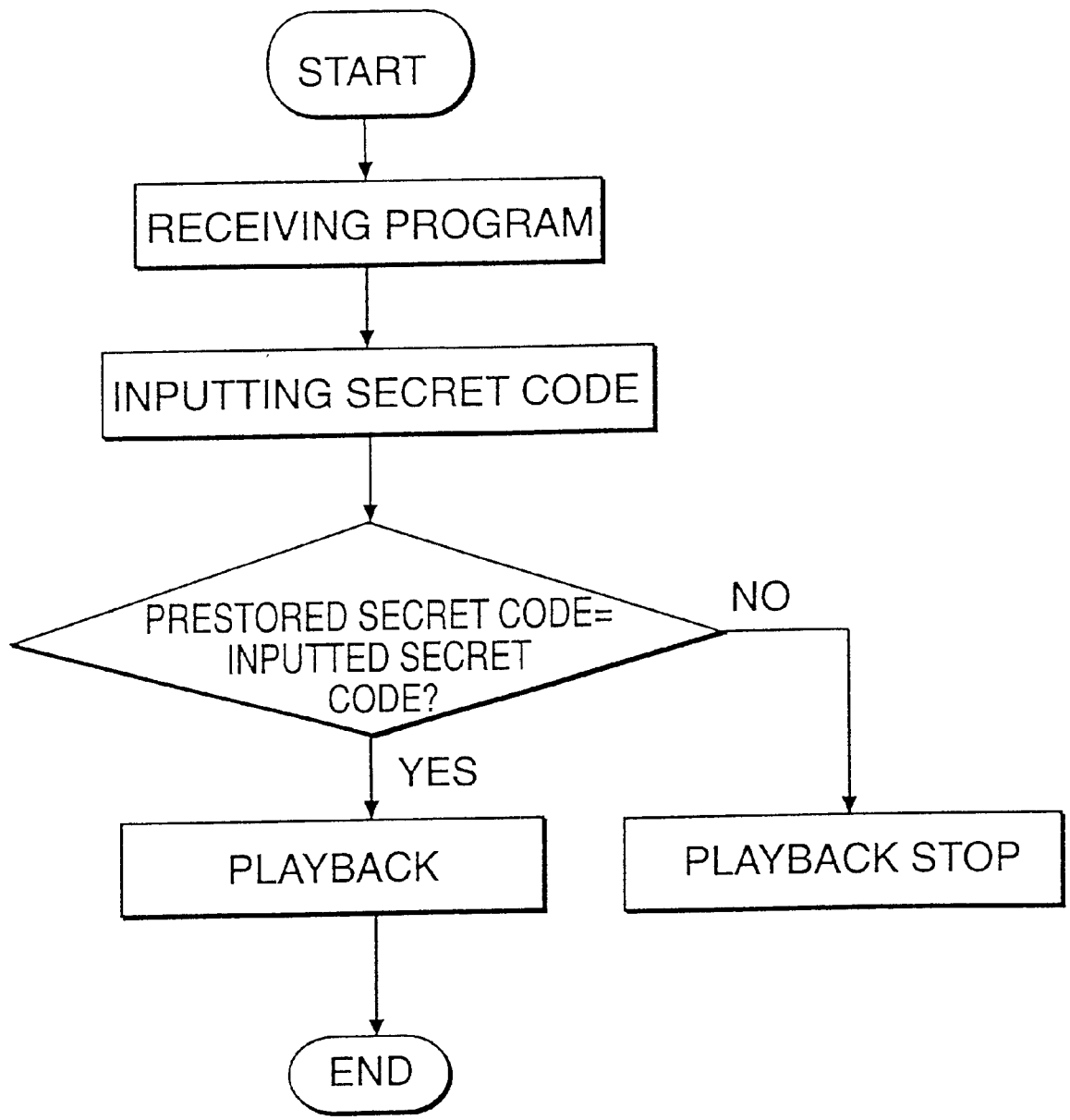
Figure 2:
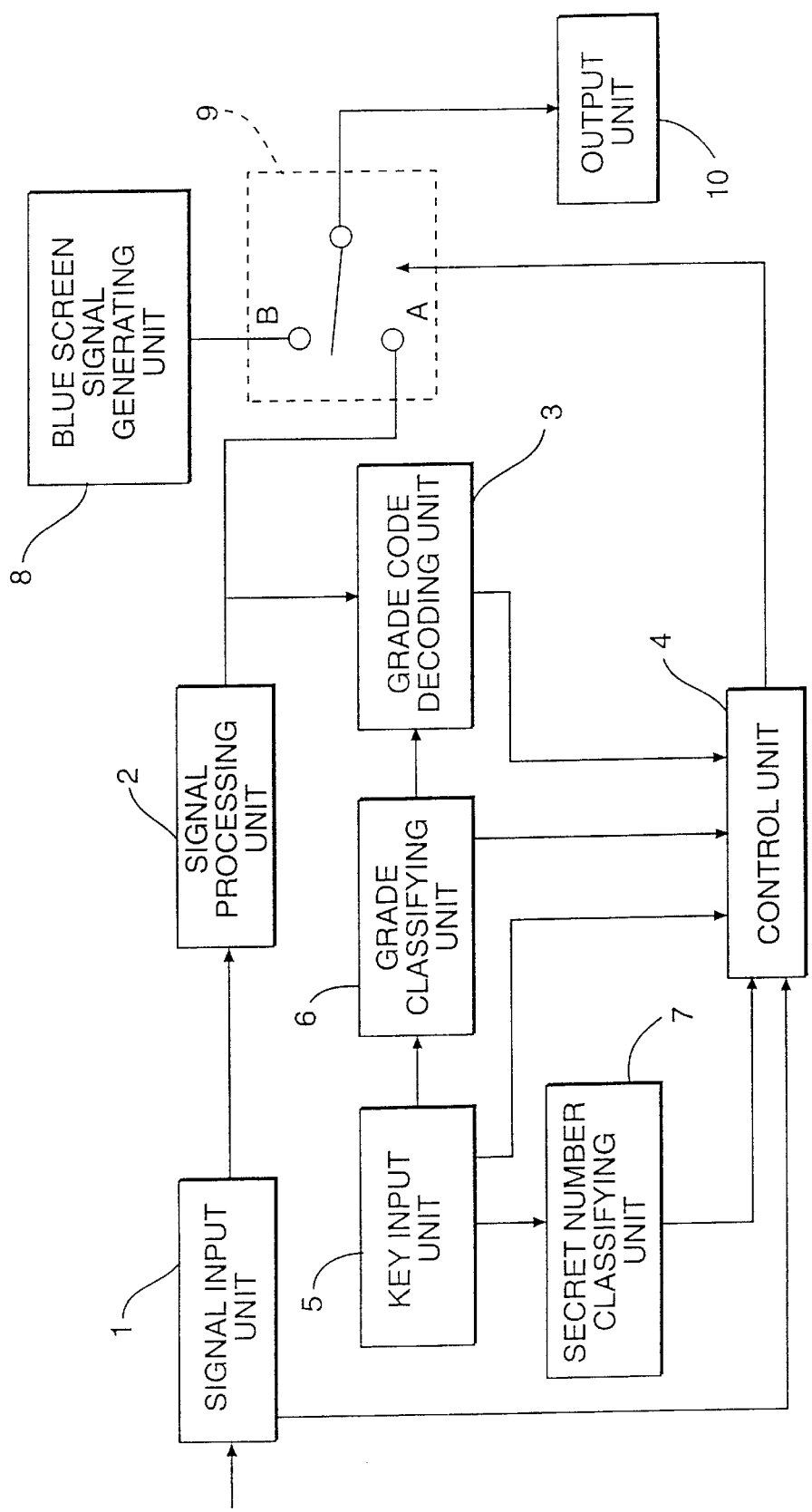
FIG. 2 is a block diagram of an apparatus for controlling video viewing according to a preferred embodiment of the present invention.

Referring to FIG. 2, the apparatus for controlling viewing of a video signal according to the preferred embodiment of the present invention, includes a signal input unit 1 for receiving a video signal carrying video programs with grade codes (e.g., rating data), a signal processing unit 2 for processing the output signal of the signal input unit 1, a grade code decoding unit 3 for decoding the grade code of a program being carried in the video signal output from the signal processing unit 2, and a control unit 4 for controlling execution of predetermined function(s) of a video machine when the decoded grade code matches a predetermined grade code. The control unit 4 controls the overall process or operation of the apparatus.

The apparatus further includes a key input unit 5 for receiving user's inputs including control data corresponding to the grades of programs and secret numbers, a grade classifying unit 6 for storing the grades of programs determined by key codes input to the key input unit 5, a secret code unit 7 for storing secret numbers determined by key codes input to the key input unit 5, a blue screen signal generating unit 8 for generating a blue screen signal, a switching unit 9 for outputting either the output of the signal processing unit 2 or the output of the blue screen signal generating unit 8 under control of the control unit 4, and a signal output unit 10 for outputting the signal selected by the switching unit 9.

The operation of the apparatus of FIG. 2 in accordance with the embodiment of the present invention is discussed hereinafter.

A video signal input to the signal input unit 1 is transmitted to the grade code decoding unit 3 and to the switching unit 9 through the signal processing unit 2. The grade code decoding unit 3 decodes the grade code of a program contained in the video signal output from the signal processing unit 2. The decoded grade code is output to the control unit 4.

The control unit 4 compares the decoded grade code with a prestored grade code of the grade classifying unit 6. When the decoded grade code matches the prestored grade code, the user is required to input control information, e.g., a secret number, to the key input unit 5 to proceed with the process.

If the inputted secret number matches a secret number prestored in the secret number classifying unit 7, the control unit 4 controls the switching unit 9 to switch to terminal A so that the video signal from the signal processing unit 2 is output to the signal output unit 10. If the inputted secret number does not match the prestored secret number, the control unit 4 controls the switching unit 9 to switch to terminal B so that a blue screen signal from the blue screen signal generating unit 8 is output to the signal output unit 10.

On the other hand, when the decoded grade code does not match the prestored grade code, the control unit 4 controls the switching unit 9 to switch to terminal A, so that the video signal from the signal processing unit 2 is output to the signal output unit 10 without relying on the input of the user's secret number.

An example of a use of a grade system is provided in accordance with the present invention. In a case where the user sets, via the key input unit 6, a grade of five or a higher grade in the grade classifying unit 6 as a threshold for controlling video signal viewing, the control unit 4 controls the switching unit 9 to output the video signal from the signal processing unit 2 without the use of a secret number when the decoded grade code represents a grade of less than five. But if the decoded grade code matches the prestored grade code, the control unit 4 controls the video machine so that the video signal is output to the output unit 10 if the inputted secret number matches the prestored secret number, or a blue screen generating signal and other signals are output to the output unit 10 if the inputted secret number does not match the prestored secret number.

The preferred embodiment of the present invention as previously described is discussed hereinafter in detail with reference to the accompanying FIGS. 3–7.

Figure 3:
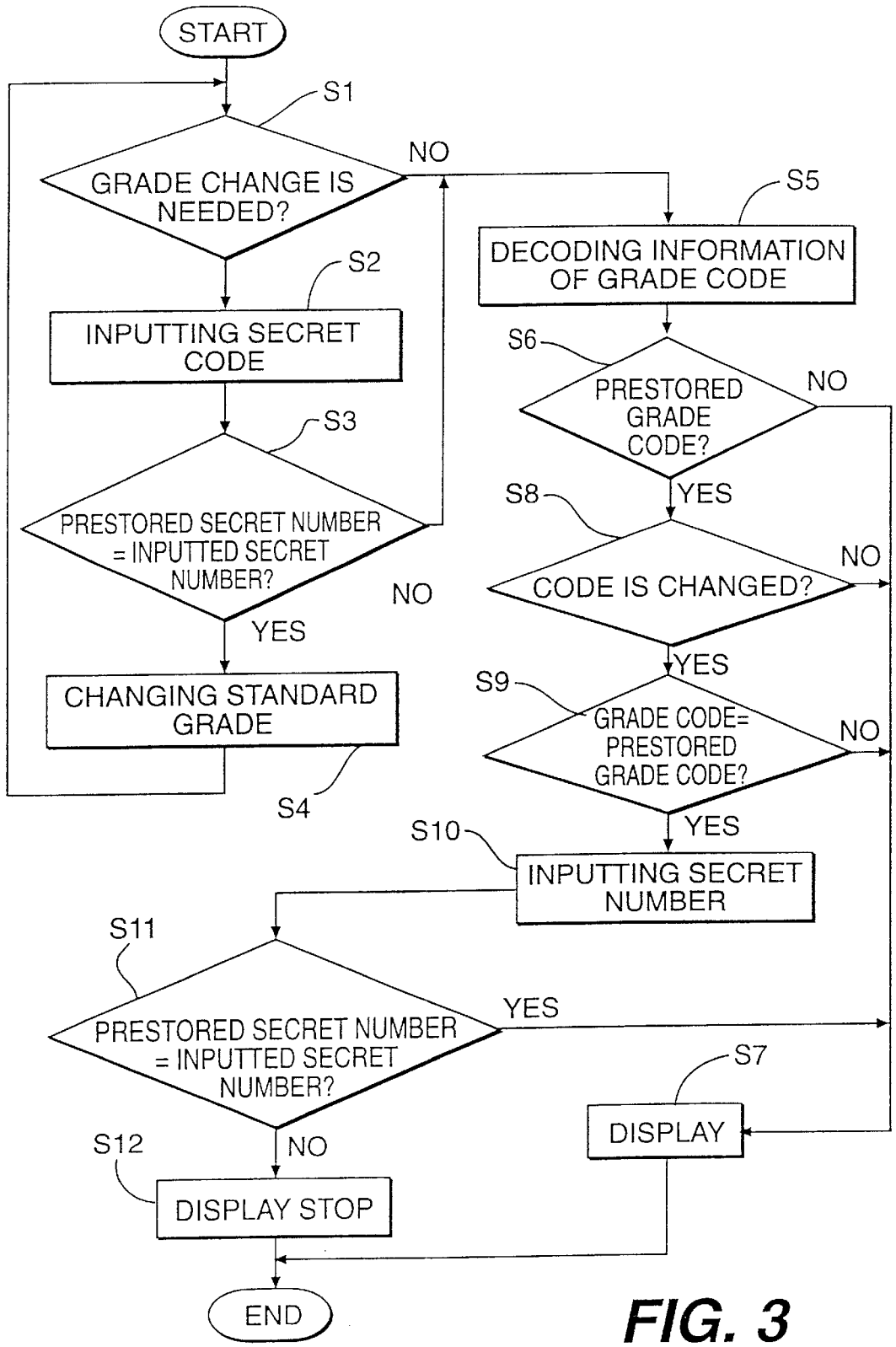
FIG. 3 is a flowchart for explaining a method of controlling video viewing in accordance with a first embodiment of the present invention.

Referring to FIG. 3 in accordance with the first embodiment of the present invention, viewing of video signals is restricted, if the inputted grade code of a video program matches a prestored grade code and an inputted secret number does not match a prestored secret number.

When the control unit 4 receives a changing signal that indicates the user's desire to change the prestored grade code stored in the grade classifying unit 6 or add a new grade code, via the key input unit 5, the control unit 4 replaces the previously prestored grade code with a new grade code only when the inputted secret number and the prestored secret number match (S1 to S4).

On the other hand, if the changing signal is not inputted, the grade code information of a video signal is decoded by the grade code decoding unit 3 and transmitted to the control unit 4 (S5). The control unit 4 determines whether the grade code decoded by the grade code decoding unit 3 equals the prestored grade code. If the decoded grade code is different from the prestored grade code, the control unit 4 controls the switching unit 9 to switch to terminal A so that the video signal of the signal processing unit 2 is output to the output unit 10 without any viewing restrictions (S6, S7).

But if the decoded grade code matches the prestored grade code, the control unit 4 checks whether the video program is a new program or whether the grade code was changed by changing the channel. The control unit 4 outputs the video signal outputted from the signal processing unit 2 when there is no change to the grade code (S8, S7). In addition, in a case where the decoded grade code does not equal the prestored grade code, the control unit 4 outputs the video signal from the signal processing unit 2 without any viewing limitations (S9, S7).

Then if the decoded grade code signal output from the grade code decoding unit 3 matches the prestored grade code, the user is required to input a secret number, which can be associated with the video program. In a case where the inputted secret number and the prestored secret number match, the control unit 4 transmits the video signal from the signal processing unit 2 to the output unit 10 (S10, S11, S7) by controlling the switching unit 9. In a case where the two secret numbers do not match (S11), the control unit 4 outputs a different screen, e.g., a blue screen which is generated by the blue screen signal generating unit 8, thereby limiting the video viewing by the particular user (S12).

Figure 4:
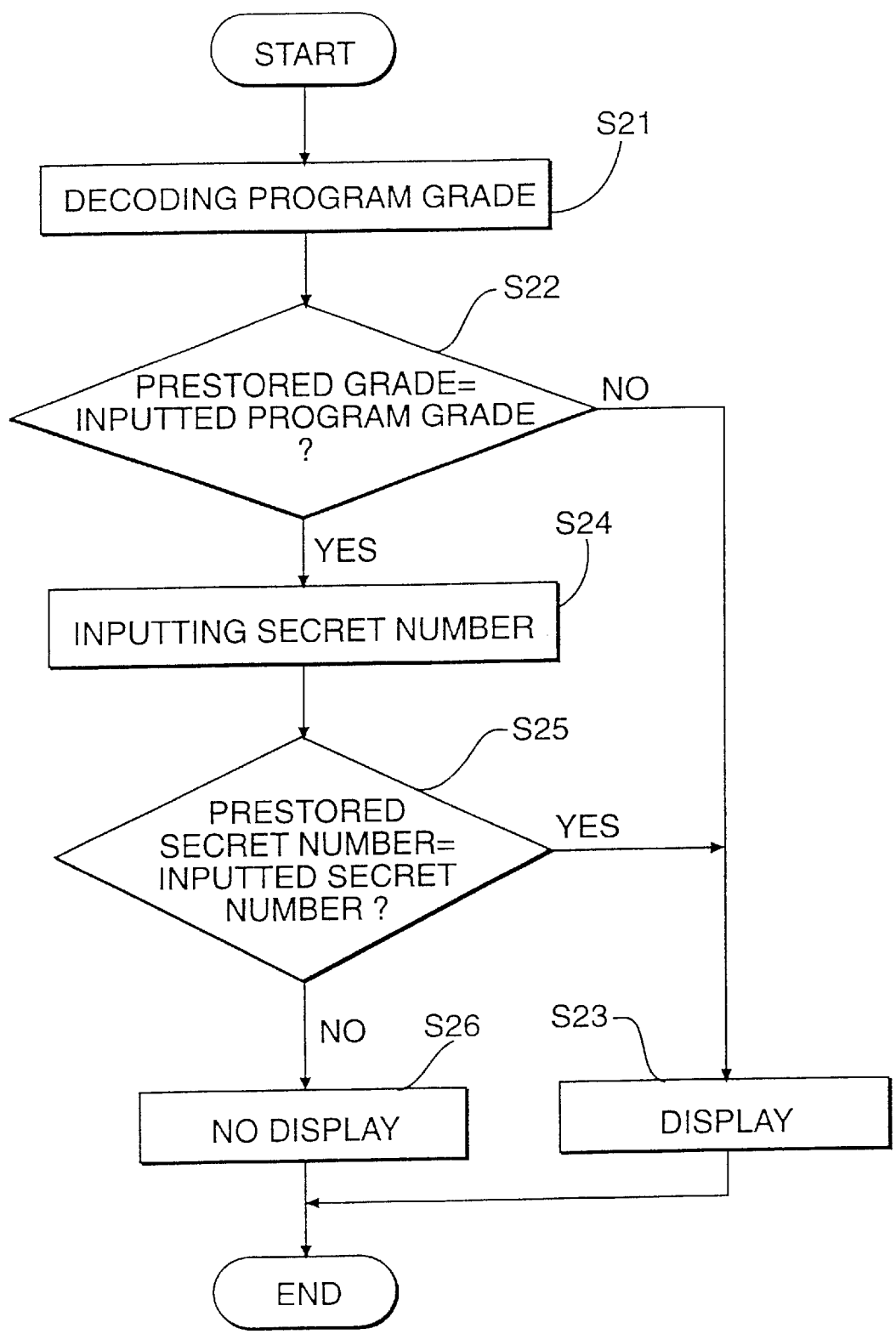
FIG. 4 is a flowchart for explaining a method of controlling video viewing in accordance with a second embodiment of the present invention.

FIG. 4 is a flowchart for explaining a method of controlling viewing of video programs having just one grade code according to the present invention. In this example, the method controls outputting of the video program having one prestored grade code, only when the inputted grade code of the video program is different from the prestored grade code.

More specifically, if the decoded grade code of the grade code decoding unit 3 does not match the prestored grade code, no viewing restriction is imposed by the control unit 4 (S21, S23). If, however, the grade codes are identical, the user is required to input a secret number (S24). If the inputted secret number and the prestored secret number match, the video program is outputted to the output unit 10. by the control unit 4 (S25, S23) and the user is allowed to view the video program. But if the two secret numbers do not match, the control unit 4 outputs a different screen, e.g., a blue screen generated by the blue screen signal generating unit 8, thereby restricting viewing of certain video programs (S26).

Figure 5:
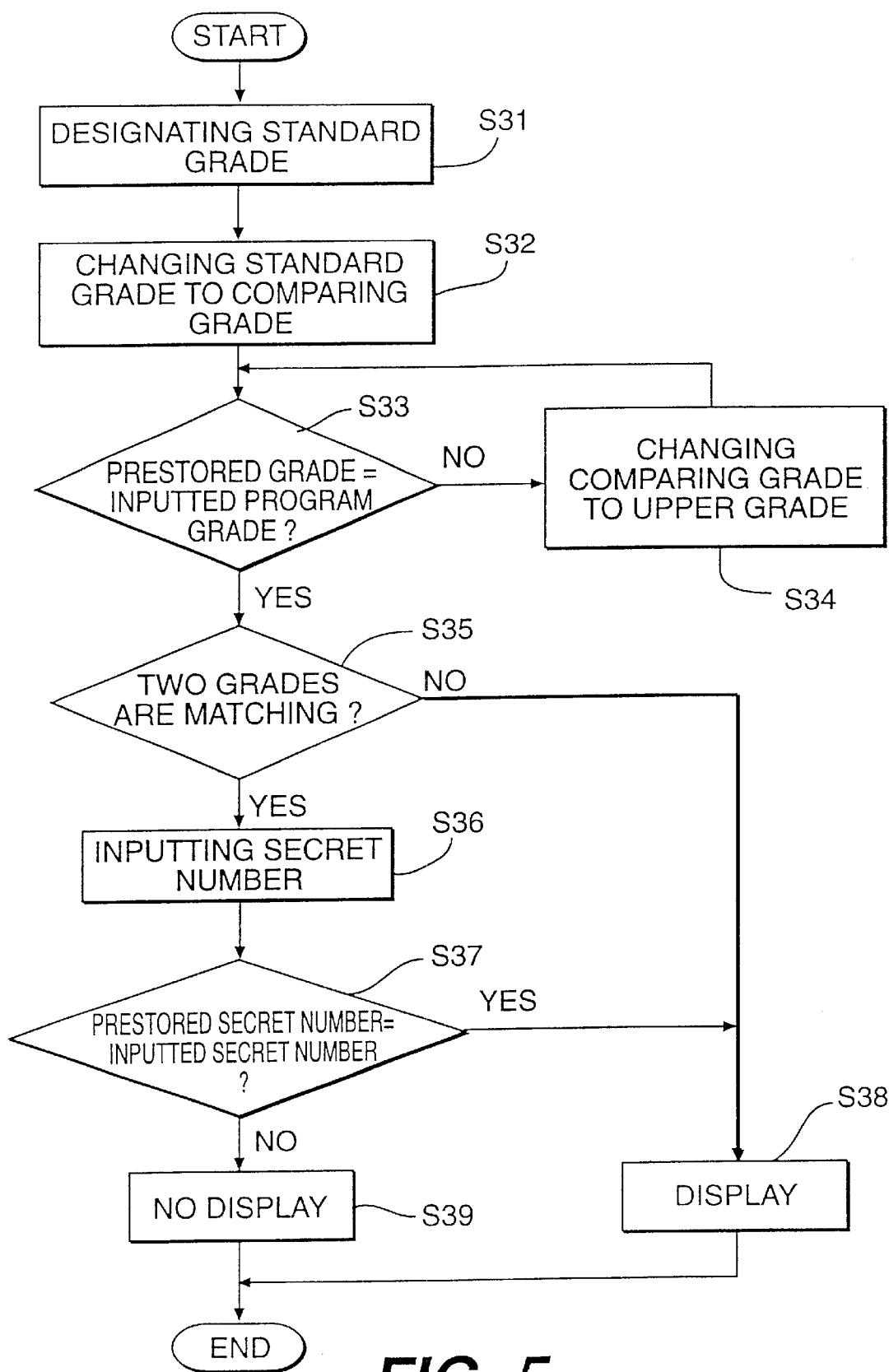
FIG. 5 is a flowchart for explaining a method of controlling video viewing in accordance with a third embodiment of the present invention.

FIG. 5 is a flowchart for explaining a method of controlling viewing of video programs that can have many different levels of grade code. In this example, the control unit 4 designates a particular grade code as the standard grade code, and uses the standard grade code as a comparing grade code to compare with the decoded grade code (S31, S32). If the decoded grade code of an inputted video program does not match the comparing grade code (stored in the grade classifying unit 6) (S33), the comparing grade code is updated with a grade code one higher than the current comparing grade code (S34). Then the comparison of the decoded grade code with the current comparing grade code is carried out again (S33).

If the decoded grade code matches the current comparing grade code (S35), then the user is required to input a secret number, so that the video program is outputted only if the inputted secret number matches the prestored secret number (S36 to S38). On the other hand, if the decoded grade code does not match the current comparing grade code (S35), then the video program is displayed to the user (S38). Further, if the inputted secret number does not match the prestored secret number, the user is denied access to the video program and a different screen, e.g., a blue screen, may be shown to the user (S37, S39), thereby controlling viewing of video programs based on grade codes and secret numbers. It is also possible to set up the video machine so that all upper grades are automatically installed in the video machine. Further, in accordance with the embodiments of the present invention, more than one secret number and grade code can be prestored for comparison.

Figures 6, 7:
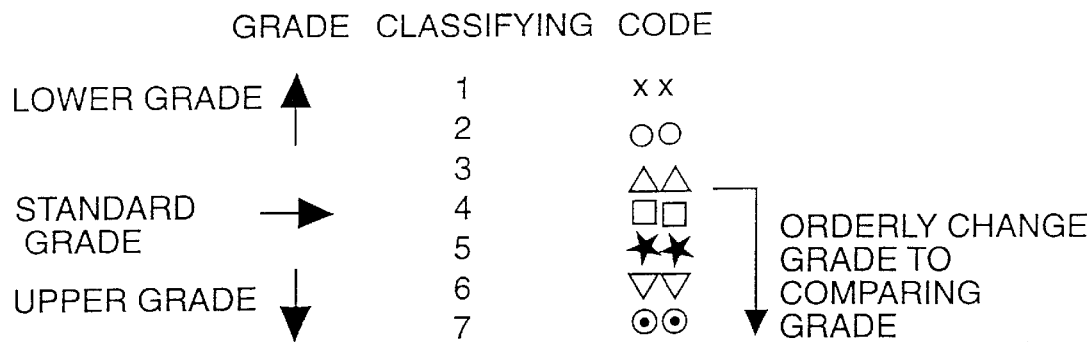
FIG. 6 shows an example of a grade system having comparative grades according to the preferred embodiment of the present invention.
FIG. 7 shows an example of a grade and code table used in the methods of the present invention.

As shown in FIG. 6, a grade of, e.g., 4 can be designated as a comparing grade initially. Then the comparing grade may be a grade of 5 or higher.

FIG. 7 represents an example of a table representing a relationship between grades, grade codes and secret numbers. In this example, each secret number corresponds to several different grade codes. For example, a first video program having grades of 1, 2, 3 may be available to all of the family members including children. A second video program having grades of 4, 5, 6 may be available to adults only, and a third video program having a grade of 7 can be available only to the user.

In accordance with the embodiments of the present invention as discussed above, the advantages including the following are provided.

First, it is possible to provide a selective video viewing system according to the program grade or user grade by comparing the grade of each program to a preset grade.

Second, secret information may not be accessed or figured out by a third party because a restricted viewing system according to the program and user classification is provided.

Third, any inconvenience of having to input a secret number each time the user wishes to access a program is eliminated because the input of the secret number is required only when the inputted program grade code matches a preset grade code.

It should also be understood that the foregoing relates to the scope of the invention as defined by the appended claims rather than by the description preceding them, and all changes that fall within meets and bounds are therefore intended to be embraced by the claims.

What is claimed is:

1. An apparatus for controlling viewing of a video signal, comprising:

a decoding unit receiving a video signal and decoding a grade code of a program contained in the video signal;

a key input for receiving control data from a user;

a control unit for first comparing the decoded grade code with at least one prestored grade code, changing the prestored grade code to at least one updated grade code based on the first comparison, second comparing the decoded grade code with the updated grade code if the prestored grade code is changed, and third comparing the control data with predetermined control data based on the first comparison and the second comparison.

2. The apparatus of claim 1, wherein the control unit changes the prestored grade code to at least one updated grade code when the first comparison indicates the decoded grade code does not equal the prestored grade code.

3. The apparatus of claim 2, wherein the control unit performs the third comparing when one of (i) the first comparison indicates the decoded grade code equals the prestored grade code and (ii) the second comparison indicates the decoded grade code equals the updated grade code.

4. The apparatus of claim 1, further comprising:

a message indicator screen signal generating unit for generating a message indicator screen signal for output to video machinery when the control data does not equal the predetermined control data.

5. The apparatus of claim 4, further comprising:

a switch for outputting the video signal when the control data matches the predetermined control data, and outputting the message indicator screen signal when the control data does not match the predetermined control data.

6. The apparatus of claim 1, wherein the control data is a secret number.

7. The apparatus of claim 1, further comprising:

a grade classifying unit for prestoring and modifying the prestored grade code based on a user input.

8. The apparatus of claim 1, further comprising:

a control data classifying unit for storing and modifying the predetermined control data based on user input.

9. The apparatus of claim 1, wherein the grade code represents rating information for the program.

10. A method for controlling viewing of a video signal, comprising:

decoding a grade code of a program contained in a received video signal;

first comparing the decoded grade code with at least one prestored grade code;

changing the prestored grade code to at least one updated grade code based on the first comparison;

second comparing the decoded grade code with the updated grade code if the prestored grade code is changed; and third comparing control data received from a user with predetermined control data based on the first comparison and the second comparison.

11. The method of claim 10, wherein the changing step changes the prestored grade code to at least one updated grade code when the first comparison indicates the decoded grade code does not equal the prestored grade code.

12. The method of claim 11, wherein the third comparing step is performed when one of (i) the first comparison indicates the decoded grade code equals the prestored grade code and (ii) the second comparison indicates the decoded grade code equals the updated grade code.

13. The method of claim 10, further comprising:

generating a message indicator screen signal for output to video machinery when the control data does not equal the predetermined control data.

14. The method of claim 13, further comprising:

first outputting the video signal when the control data matches the predetermined control data; and second outputting the message indicator screen signal when the control data does not match the predetermined control data.

15. The method of claim 10, wherein the control data is a secret number.

16. The method of claim 10, further comprising:

prestoring and modifying the prestored grade code based on a user input.

17. The method of claim 10, further comprising:

storing and modifying the predetermined control data based on user input.

18. The method of claim 10, wherein the grade code represents rating information for the program.

* * * * *